United States Patent [19]

Nogami et al.

[11] Patent Number: 4,729,254

[45] Date of Patent: Mar. 8, 1988

[54] STEERING SYSTEM

[75] Inventors: Masateru Nogami; Hozumi Suzuki, both of Tokyo, Japan

[73] Assignees: Isumi Corporation Industries, Inc., N.Y.; Izumi Motor Co., Ltd., Tokyo, Japan

[21] Appl. No.: 939,769

[22] PCT Filed: Mar. 14, 1985

[86] PCT No.: PCT/JP85/00125

§ 371 Date: Nov. 14, 1986

§ 102(e) Date: Nov. 14, 1986

[87] PCT Pub. No.: WO86/05452

PCT Pub. Date: Sep. 25, 1986

[51] Int. Cl.[4] .......................... B62D 1/10; B62D 1/16
[52] U.S. Cl. ..................................... 74/484 R; 74/492; 74/552; 200/61.54; 267/155; 267/158
[58] Field of Search ...................... 74/484 R, 492, 552; 200/61.54; 267/155, 158

[56] References Cited

U.S. PATENT DOCUMENTS

| D. 247,115 | 1/1978 | Cox et al. | D14/13 |
|---|---|---|---|
| 2,138,163 | 11/1938 | Harris | 180/78 |
| 2,644,858 | 7/1953 | Small | 179/146 |
| 2,863,015 | 12/1958 | Ahrens | 200/61.54 |
| 3,150,338 | 9/1964 | Weiner | 74/10.41 X |
| 3,548,128 | 12/1970 | Willett | 200/61.57 |
| 3,606,525 | 9/1971 | Landree | 267/155 X |
| 4,056,696 | 11/1977 | Meyerle et al. | 179/100 R |
| 4,455,454 | 6/1984 | Umebayashi | 179/2 E |
| 4,485,371 | 11/1984 | Yamada et al. | 340/52 R |
| 4,598,603 | 7/1986 | Hiramitsu et al. | 200/61.54 X |
| 4,602,523 | 7/1986 | Kurata et al. | 200/61.54 X |

FOREIGN PATENT DOCUMENTS

| 47498 | 3/1982 | European Pat. Off. . |
| 54-1972 | 1/1979 | Japan . |
| 57-48156 | 3/1982 | Japan . |
| 58-69144 | 4/1983 | Japan . |
| 59-32540 | 2/1984 | Japan . |
| 59-32542 | 2/1984 | Japan . |
| 59-118547 | 7/1984 | Japan . |
| 59-120546 | 7/1984 | Japan . |
| 59-227535 | 12/1984 | Japan . |

*Primary Examiner*—Allan D. Herrmann
*Attorney, Agent, or Firm*—Fleit, Jacobson, Cohn & Price

[57] ABSTRACT

There is disclosed a mechanism for stationarily supporting an operation panel mounted on a steeering wheel of a movable body. This mechanism includes two external gears between which said steering wheel is interposed, and two satellite gears resiliently urged toward the external gears. One of the external gears is stationary and the other has an operation panel secured thereto. Two satellite gears are rotated in the same direction and as a result, the operation panel is rotated in the opposite direction to that of the steering wheel and keeps substantially stationary. Further, there is disclosed a signal transmitting system for a radiotelephone in the movable body. A microphone is provided on the operation panel and a speaker unit is located at any position in the movable body. A duplex signal transmitting path having a howling control function is provided between the microphone and the speaker unit.

1 Claim, 7 Drawing Figures

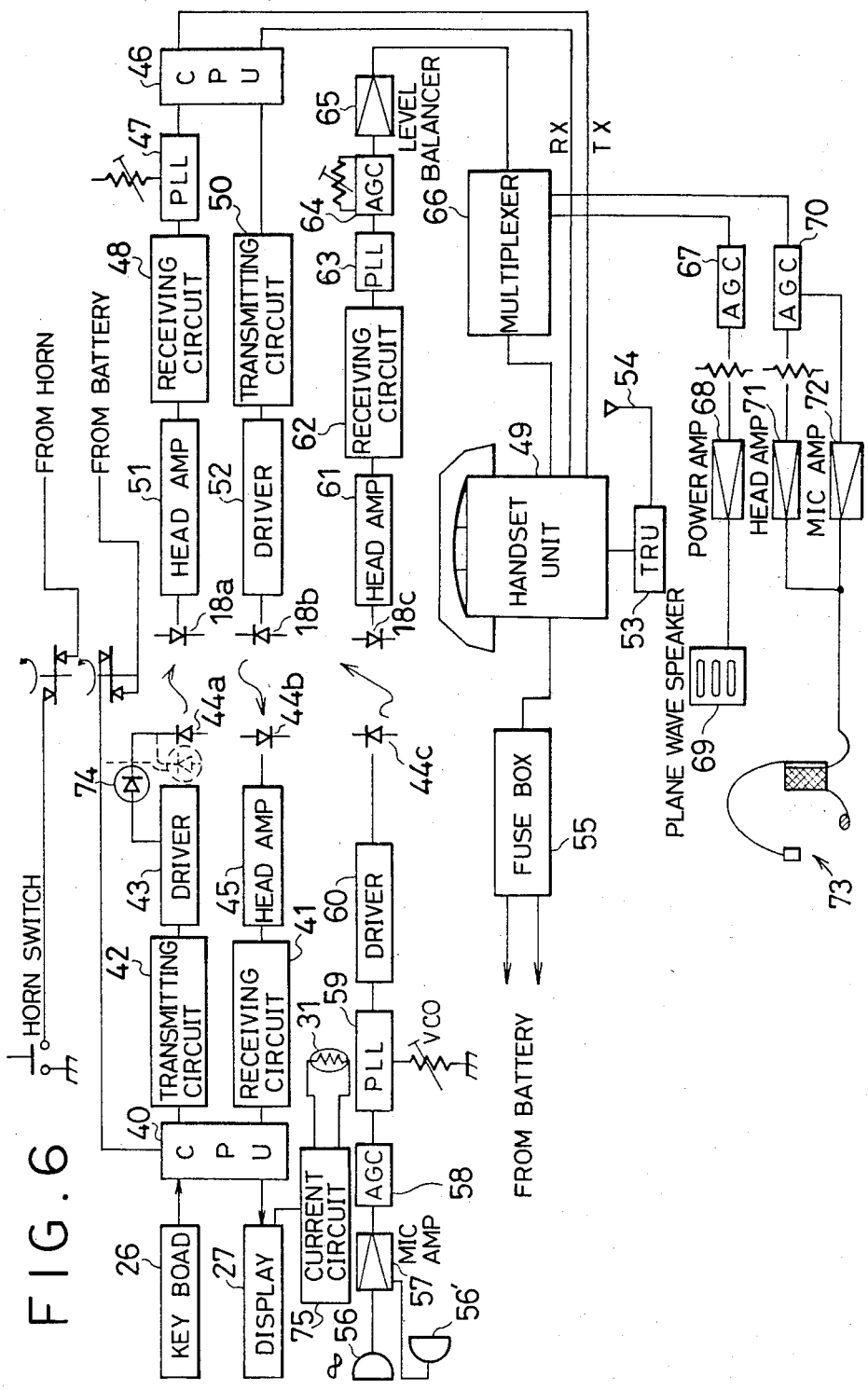

STEERING SYSTEM

DESCRIPTION

1. Technical Field

The present invention relates to a steering system, in particular a mechanism for mounting an operation panel of a radiotelephone on the top surface of the rotating shaft of a steering wheel with which a movable body such as automobile or the like is equipped, said radiotelephone including push buttons and adapted to be installed in the movable body, and a system for transmitting signals between the operation panel and the base unit of the radiotelephone.

2. Background Art

In a movable body such as an automobile or the like, the steering wheel is located nearest the driver and accessible to his hands. In order to improve the handling by the driver of the operation panel including key switches for control and instruction of various units installed in the automobile, it is desirable to mount the operation panel on the top surface of the rotating shaft of the steering wheel.

Further, in the case of the movable body such as automobile or the like where a radiotelephone is installed, there is no way other than to locate the base unit of the radiotelephone at the position far away from the speaker including the driver. Consequently, in order to prevent the surrounding noise from being transmitted through the telephone, a mouthpiece section such as a microphone or the like is designed to be separatable from the base unit of the radiotelephone while both are connected with each other through a cord so that the mouthpiece section can be accessed by the speaker when he wishes to speak through the radiotelephone. However, while the driver is speaking through such a type of radiotelephone, he needs to keep holding the microphone or the like with at least one of his hands. As a result, he often drives a car dangerously with only one hand. It is preferable to enable the driver to speak safely while driving because he has many chances to speak through the radiotelephone installed in the automobile or the like.

In order to resolve the above-mentioned problem, Japanese Patent Public Disclosure No. 59-32542 discloses a technology. According to the disclosure, a steering apparatus of an automobile is equipped with a radiotelephone, an operation panel of which is mounted on the top surface of the rotating shaft of a steering wheel. The operation panel includes operation keys such as number keys and control keys of the radiotelephone, and a microphone. Such a radiotelephone that has the operation panel mounted on the top surface of the steering wheel needs an additional mechanism for enabling the operation panel to keep substantially stationary without rotating together with the steering wheel.

In the disclosure, there is shown a mechanism for stationarily supporting the operation panel, said mechanism comprising a first external gear fixed on a column cover positioned under the spoke of the steering wheel, the steering shaft of which passes through the first external gear and is freely rotatable therein, a second external gear rotatably supported on the upper end of the steering shaft which extends over the spoke of the steering wheel, an operation panel fixed on the upper surface of said second external gear, a rotating shaft vertically passing through the spoke integrally formed with the steering shaft, said rotating shaft being rotatable in the spoke, and satellite gears secured to the upper and lower ends of said rotating shaft and adapted to engage said first and second external gears. This mechanism allows the operation panel to rotate in the opposite direction to that in which the steering wheel is rotated and by the same rotational angle as that thereof. Consequently, the operation panel can remain substantially stationary even when the steering wheel is rotated.

The stationary supporting mechanism is so designed that the rotating shaft of the two satellite gears which is adapted to engage the first and second external gears passes through the spoke and is freely rotatable therein. Because of this arrangement, in order to always ensure suitable engagement between the two external gears and the satellite gears, it is necessary to precisely position the through hole for the rotating shaft, resulting in the requirement of high precision in design. Additionally, in assembling the arrangement, a bearing is fitted into the through hole, the rotating shaft is inserted into the bearing, and at the same time, the satellite gears secured to the opposite ends of the rotating shaft are brought into engagement with the two external gears. Therefore, this has a low operational efficiency. Besides, the satellite gears cannot follow the external gears when the external gears move eccentrically. As a result, the second external gear moves at a different speed from the spoke, leading to failure to keep the operation panel stationary.

In the system wherein a microphone is provided on the operation panel, the microphone is remote from the driver's mouth compared with the case where he speaks through the transmitter of a handset, and therefore together with his voice noise is likely to enter the microphone.

In order to resolve this problem, the system according to the above-mentioned disclosure includes a pair of microphones positioned at a predetermined distance from each other on the operation panel and directed at the driver's mouth, the output terminals of the microphones being respectively connected with different input terminals of a differential amplifier. According to this system, the differential amplifier amplifies the difference between the audio signal entering one of the microphones and the audio signal entering the other, resulting in an offsetting of same-phase noise which has laterally entered the microphone, greatly amplifying only the signal representing the driver's voice.

This system enables noise to be reduced to some degree. However, the system can not control the occurance of howling wherein the sound coming out of the speaker unit enters the microphone which in turn amplifies the audio signal, and then the amplified signal again comes out of the speaker and returns to the microphone, a cycle which is repeated, resulting in gradualy increasing sound from the speaker unit.

DISCLOSURE OF INVENTION

The first features of the present invention are directed to an improvement of the operation panel wherein the rotating shaft of the satellite gears is designed to be resiliently urged toward the external gears instead of passing through the spoke. In a preferable example, a resilient member such as leaf spring or coil spring is used for resiliently urging the rotating shaft of the satellite gears toward the external gears and is connected at its one end with the spoke or the rotating shaft either directly or through another member.

The system according to the present invention is so arranged that the satellite gears are resiliently urged toward the external gears and, therefore, the system enables the satellite gears to always follow the possible eccentric movement of the external gears. Accordingly, it is not necessary according to the present invention to take into consideration the position of the through hole for the satellite gear axis, unlike the prior art, and freedom of design is greatly improved. The present invention has advantages in work efficiency because in assembling the system, it is merely necessary to previously couple the satellite gear shaft with the resilient member and later mount them on the spoke.

The second feature of the present invention is directed at a howling control system. According to the present invention, between the microphone and the base unit of the radiotelephone is provided a signal transmitting path including a light transmitting path where a phase locked loop (PLL), an automatic gain control (AGC), and a level balancer are connected with each other in series. After the level balancer has been once regulated and set at a certain howling level, the AGC automatically controls the gain of the output of the PLL within the range of the set howling level in response to the surrounding noise, resulting in change of the sound level. According to the present invention, a plane wave speaker unit is used to facilitate the howling control by the phase control.

The present invention, in comparison with the conventional signal transmitting system using only frequency modulation, enables howling control to be effected by using phase modulation. Consequently, the present invention provides a solution for the problem in the prior art wherein it is difficult to perform duplex signal transmission due to the occurrence of howling.

BRIEF DESCRIPTION OF DRAWINGS

FIG. 6 is a block diagram showing the signal transmitting system between the operation panel and the base unit of the radiotelephone.

BEST MODE FOR CARRYING OUT THE INVENTION

FIGS. 1 to 4 show the embodiments demonstrating the first feature of the present invention.

Figure 1:
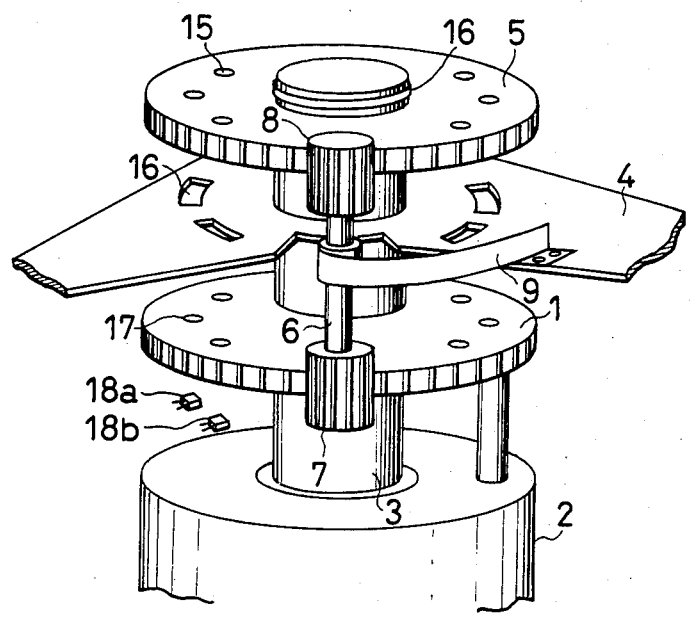
FIG. 1 is a schematic perspective view showing one embodiment of the mechanism according to the present invention for stationarily supporting the operation panel on the steering wheel.

Referring to FIG. 1, a first external gear 1 is fixed to a column cover 2 which is secured to the frame of the automobile. A steering shaft 3 passes through the center of the column cover 2 and extends upwardly through the first external gear 1. The steering shaft 3 is arranged so that it can freely rotate in the first external gear 1. The steering shaft 3 further extends upwardly through the spoke 4 of the steering wheel 80 (see FIG. 7). A second external gear 5 is rotatably mounted on the portion of the steering shaft 3 over the spoke 4. The spoke 4 is secured to the steering shaft 3 so that the former can be integrally rotated with the latter. A rotating shaft 6 extends parallel to the steering shaft 3. Satellite gears 7 and 8 are secured to the opposite ends of the rotating shaft 6 and adapted to engage the first and second external gears respectively.

Figure 2:
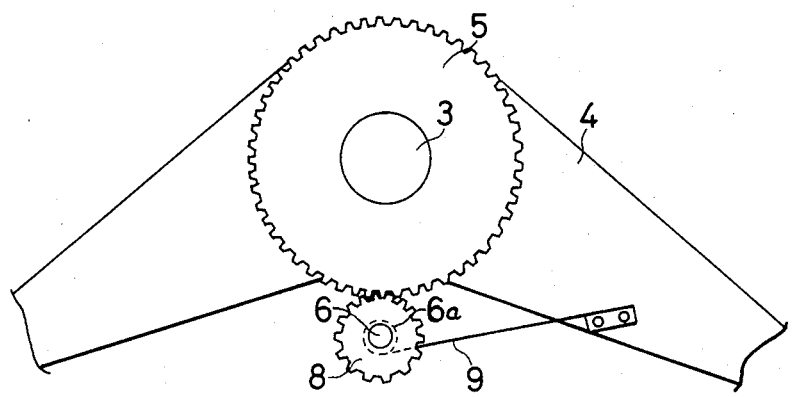
FIG. 2 is a schematic plan view of the mechanism as shown in FIG. 1.

In the embodiment as shown in FIGS. 1 and 2, a leaf spring 9 is used as the resilient means which urges the rotating shaft 6 toward the steering shaft 3 so that the two external gears 1 and 5 are kept in engagement with the two satellite gears 7 and 8 at all times. One end of the leaf spring 9 is secured to the spoke 4, while a bearing 6a for the rotating shaft 6 is provided at the other end of the spring leaf 9. The resilient force of the leaf spring 9 is not so high as to prevent the second external gear 5 from rotating but is enough to make the satellite gears follow the external gears.

Figure 3:
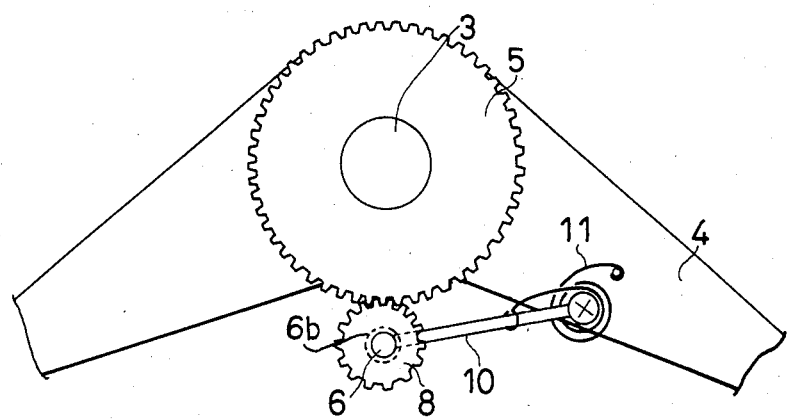
FIG. 3 is a schematic plan view showing another embodiment of the mechanism according to the present invention for stationarily supporting the operation panel.

In the embodiment as shown in FIG. 3, a rod 10 and a coil spring 11 are used as the resilient means which urges the rotating shaft 6 of the satellite gears 7 and 8 toward the steering shaft 3. One end of the rod 10 is pivotably mounted to the spoke 4, while a bearing 6b for the rotating shaft 6 is provided at the other end of the rod 10. The coil spring 11 is secured at its one end to the spoke and hooked at its other end to the rod 10. The coil spring 11 is wound about the rod 10 so that the end of the rod 10 is urged toward the steering shaft 3. The resilient force of the coil spring 11 has a predetermined strength, like that of the above-mentioned leaf spring 9.

Figure 4:
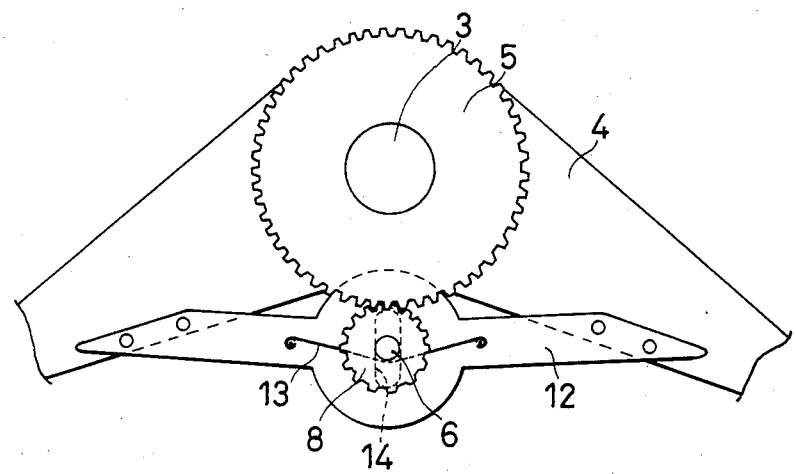
FIG. 4 is a schematic plan view showing yet another embodiment of the mechanism according to the present invention for stationarily supporting the operation panel.

In the embodiment as shown in FIG. 4, a support 12 and a leaf spring 13 are used as the resilient means which urges the rotating shaft 6 of the satellite gears 7 and 8 toward the steering shaft 3. The support 12 is fixed at its opposite ends to the two spokes which radially extend from the steering shaft 3 to the steering wheel and provided at its middle portion with a slot 14 which elongates along the radial direction of the external gears. The rotating shaft 6 of the satellite gears 7 and 8 is inserted in the slot 14 so that the rotating shaft can freely move along the radial direction of the external gears 5 in the slot 14. The leaf spring 13 extends across the slot 14 and is secured at its opposite ends to the support 12. The leaf spring 13 contacts at its middle portion the rotating shaft 6, whereby the rotating shaft 6 is urged toward the steering shaft 3. Consequently, the external gears 1 and 5 are kept in engagement with the satellite gears 7 and 8 at all times. In this embodiment, the support 12 which is firmly secured to the spoke 4 is used for supporting the rotating shaft 6. Accordingly, the stability of the rotating shaft is improved compared with the above-mentioned first and second embodiments.

Figure 5:
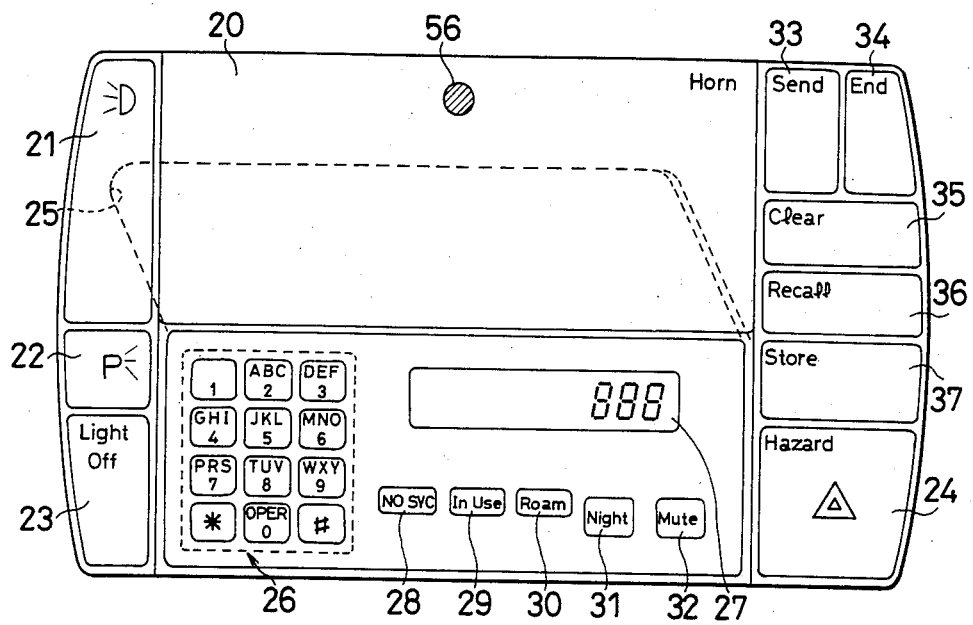
FIG. 5 is a plan view of the operation panel.

An operation panel 81 (see FIG. 7) is adapted to be fixed on the top surface of the second external gear 5 as shown in FIGS. 1 to 4. One example of such an operation panel is shown in FIG. 5. Referring to FIG. 5, reference numeral 20 designates a horn switch which is connected with an automobile horn. The horn sounds when the horn switch is depressed. Reference numerals 21 and 22 designate a headlight switch and a parking lamp switch. Reference numeral 23 designates a turn-off switch for headlights and parking lamps. Reference numeral 24 designates a hazard light switch. Reference numeral 25 designates a cover for telephone operation which is normally closed and adapted to be opened when the telephone is used.

Reference numeral 26 designates a keyboard on which push buttons for the telephone are located. Reference numeral 27 designates a display which displays the telephone number etc. with ten segments. Reference numeral 28 designates an indicator which is turned on when the automobile is out of the telephone call service area. The reference numeral 29 designates an indicator which is turned on only during telephone communication. Further, reference numeral 30 designates an indicator which indicates that signal communication with another service area is underway and is automatically turned on when the automobile goes out of its own service area. Reference numeral 31 designates a switch which is used for adjusting the brightness of the display screen. Reference numeral 32 designates a muting switch which is used for interrupting the voice of the speaker while it is depressed. Reference numeral 33 designates a transmitting/receiving switch and is used when transmitting or receiving. Reference numeral 34 designates a telephone communication ending switch which is depressed when the telephone communication is over. Reference numeral 35 designates a clear switch which is used to erase the display image. Reference numeral 36 is a recall switch which reads out the telephone number as previously stored. Reference numeral 37 designates a store switch which is used when storing a telephone number.

On the rear of the operation panel as shown in FIG. 5 is mounted a circuit board (not shown) which is connected with the above-mentioned switches and indicators, etc. In addition, on the circuit board are mounted a signal processing section using a CPU, and a plurality of infrared diodes 44a, 44c and photodiodes 44b (see FIG. 6) functioning as a transmitting/receiving circuit or a signal input/output section which will be described hereinafter. A plurality of through holes 15 are provided on the external gear 5 at the positions which correspond to that of the circuit board where the infrared diodes or the photodiodes are mounted when the operation panel is secured to the external gear 5 as shown in FIG. 1. These through holes 15 are spaced on a predetermined circle around the steering shaft. A plurality of apertures 16 are provided on the spoke 4 along a circle having the same radius as that of the circle where the through holes 15 are located. A plurality of through holes 17 are provided on the first external gear 1 under the spoke 4. Infrared diodes 18b and photodiodes 18a, 18c are located underneath the through holes 17. In this arrangement, a plurality of light signal transmitting paths are formed between the infrared diodes 44a, 44c and photodiodes 44b mounted on the circuit board at the rear of the operation panel, and the infrared diodes 18b and photodiodes 18a, 18c under the external gear 1. The apertures formed on the spoke 4 have a predetermined length along the circumferential direction and are spaced at a predetermined distance. These aperture lengths and distances are selected so that at least one two-way path set out of the above-mentioned light signal transmitting paths can be ensured even if the spoke 4 is moved relatively to the external gear 5 during rotation of the steering wheel. On the upper end of the steering shaft 3 is fitted a slip ring 19 which is connected with an automobile battery (not shown) through conductive lines which pass through the inside of the steering shaft 3. A brush (not shown) which is adapted to contact the slip ring 19 is mounted on the side of the operation panel. In this manner, a power supply to the operation panel is attained by such a drum-type slip ring 19 and the brush.

FIG. 6 is a block diagram of the signal transmitting system showing the second feature of the present invention. Referring to FIG. 6, the signal transmitting system between the operation panel and the base unit of the radiotelephone is generally divided into the signal transmitting system of the operation panel, light signal transmitting path and the signal transmitting system of the radiotelephone base unit. CPUs are located on both the signal transmitting system of the operation panel and the signal transmitting system of the radiotelephone base unit. A keyboard 26 and a receiving circuit 41 are connected with the input terminal of the CPU 40 of the operation panel, and a display 27 and a transmitting circuit 42 are connected with the output terminal of the CPU 40. The transmitting circuit 42 modulates the output signal from the CPU 40 and provides an output which is used to drive the above-mentioned infrared diode 44a of the operation panel through a driver 43. On the other hand, an output signal emitted from the light receiving diode 44b of the operation panel is amplified by a head amplifier 45 and supplied to the receiving circuit 41.

One of the input terminals of the CPU 46 of the radiotelephone base unit is connected with a receiving circuit 48 through a phase locked loop (PLL) circuit 47 and the other input terminal is connected with the output terminal of a handset unit 49 of the radiotelephone through a multiplexer 66. One of the output terminals of the CPU 46 is connected with a transmitting circuit 50 and the other output terminal is connected with the input terminal of the handset unit 49. The receiving circuit 48 and the transmitting circuit 50, in the same manner as the case mentioned above, are respectively connected with the photodiode 18a through a head amplifier 51, and with the infrared diode 18b through a driver 52. Moreover, the PLL 47 which is disposed between the CPU and the receiving circuit 48 is used to lock the frequency of the output signal of the receiving circuit at that of the reference signal.

The handset unit 49 is connected with a transceiver unit 53 which is in turn connected with an antenna 54. The transceiver unit 53 transmits and/or receives signals through the antenna 54. The power supply terminal of the handset 49 is connected with the automobile battery (not shown) through a fuse box 55. Normally, voice transmitting/receiving is carried out by use of the handset 49.

In the signal transmitting system as shown in figures, voice transmitting/receiving can be also carried out by use of a microphone 56 (see FIG. 5) located on the operation panel, and a plane wave speaker unit 69 provided at the front of the driver in the automobile interior. Descriptions will be hereinafter made in relation to the audio signal transmitting system using the microphone 56 and the plane wave speaker unit 69. Another microphone 56' is used in addition to the microphone 56 but only the microphone 56 is exposed on the surface of the operation panel at the upper portion of the horn switch 20. The audio signal which is supplied through the two microphones 56 and 56' is transmitted to a microphone amplifier 57. In the microphone amplifier 57, vibration noise which enters each of the two microphones is differentially amplified and eliminated. The output of the microphone amplifier 57 has its frequency controlled by an automatic gain control (AGC) 58 and then has its phase modulated by a PLL 59, and the output is then supplied to the driver 60 to drive the infrared diode 44c.

The light emitted from the infrared diode 44c is received by the photodiode 18c through the above-mentioned light transmitting path. The signal from the photodiode 18c is amplified by a head amplifier 61 and then demodulated by a receiving circuit 62 and a PLL 63. The demodulated signal is applied to a multiplexer 66 through an AGC 64 and a level balancer 65 and supplied to the plane wave speaker unit 69 through an AGC 67 and a power amplifier 68. The AGC 64 and the level balancer 65 are used to control the howling. The level balancer 65 sets the howling level and the AGC 64 controls the output level of the PLL 63 at the set howling level range. Use of the plane wave speaker unit 69 expands the area where no howling occurs and facilitates setting of the howling level.

A head amplifier 71 and a microphone amplifier 72 are also connected with the multiplexer 66 through another AGC 70. A plug of a headphone set 73 is adapted to be inserted into the input terminals of these amplifiers. On the operation panel, a photodiode 74 is connected with the infrared diode 44a in series (solid line) or in parallel (broken line). The photodiode 74 is turned on in response to the light emission of the infrared diode 44a when a signal is transmitted from the operation panel to the radiotelephone base unit. To a display circuit 27 is connected a current flow circuit 75 which controls the current flow to be supplied to the display circuit in response to the actuation of a night switch 31 on the operation panel to thereby control the blightness of the display screen. Supply of power to the CPU is carried out by the slip ring and the brush as mentioned above. On the operation panel, switches for various items of equipment of an automobile such as horn switch are also provided in addition to the switches of the radiotelephone. These switches are connected with the automobile's various equipment and battery through the means of a slip ring and brush. The connecting means as shown in figures, like that described above, is an example of the disc-type slip ring but any other slip ring such as drum or disc types may be used.

Figure 7:
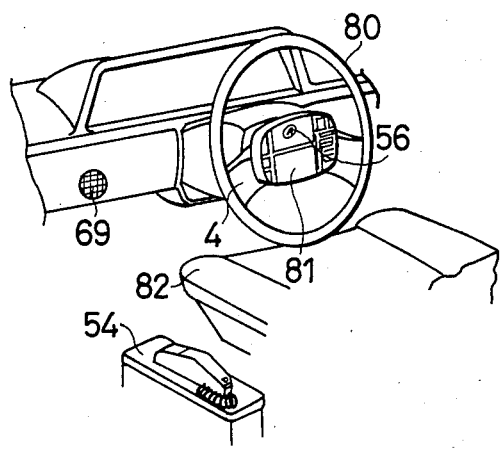
FIG. 7 is a perspective view showing the steering wheel, the driver's seat and the other neighboring instruments of the automobile which is equipped with the operation panel stationarily supporting mechanism and the signal transmitting system according to the present invention.

As hereinbefore described, the signal transmitting system of the present invention incudes a howling control function which resolves the problem in the duplex communication using the microphone and the speaker unit, and enables easy telephone communication even during driving. Moreover, FIG. 7 is a schematic view showing the neighborhood of the driver's seat of the automobile where the operation panel stationary supporting mechanism and the signal transmitting system according to the present invention are incorporated. In FIG. 7, reference numerals 80, 4, and 81 designate a steering wheel, a spoke, and an operation panel respectively. As mentioned above, the microphone 56 is located on the upper portion of the surface of the operation panel and the plane wave speaker unit is located at the front of the steering apparatus. Reference numeral 2 designates a driver's seat, on the left of which the handset unit 49 or the radiotelephone base unit is located.

INDUSTRIAL APPLICABILITY

The operation panel stationary supporting mechanism of the present invention is applicable to all movable bodies such as automobiles, vessels or others having a rotary handle-type steering apparatus. The signal transmitting system with howling control function according to the present invention is useful for the drivers of the movable bodies to communicate with others by use of the radiotelephone equipped therein.

We claim:

1. A steering apparatus comprising a first external gear fixed on a column cover positioned under the spoke of a steering wheel, the steering shaft of which passes through the first external gear and is freely rotatable therein, a second external gear rotatably supported on the upper end of the steering shaft which extends over the spoke of the steering wheel, an operation panel fixed on the upper surface of said second external gear, a rotating shaft located parallel to the steering shaft, satellite gears secured to the upper and lower ends of said rotating shaft and adapted to engage said first and second external gears, a rod which is pivotably supported at its one end on the spoke of the steering wheel and has at its other end a bearing for rotatably supporting the rotating shaft of the satellite gears, a coil spring which is secured at its one end to the spoke and hooked at its other end to the rod, said coil spring being wound around the rod so that the rod is urged toward the steering shaft, whereby the rotating shaft is resiliently urged to the steering shaft.

* * * * *